United States Patent
Monteilliet et al.

(10) Patent No.: US 8,169,474 B2
(45) Date of Patent: May 1, 2012

(54) SYSTEM FOR TAKING IMAGES OF THE FACE OF AN INDIVIDUAL

(75) Inventors: Gilles Monteilliet, Paris (FR); Joël-Yann Fourre, Paris (FR)

(73) Assignee: Morpho, Paris (FR)

( * ) Notice: Subject to any disclaimer, the term of this patent is extended or adjusted under 35 U.S.C. 154(b) by 396 days.

(21) Appl. No.: 12/518,699

(22) PCT Filed: Dec. 18, 2007

(86) PCT No.: PCT/EP2007/011097
§ 371 (c)(1),
(2), (4) Date: Jun. 11, 2009

(87) PCT Pub. No.: WO2008/074459
PCT Pub. Date: Jun. 26, 2008

(65) Prior Publication Data
US 2010/0013915 A1    Jan. 21, 2010

(30) Foreign Application Priority Data
Dec. 19, 2006 (FR) ..................... 06 11109

(51) Int. Cl.
*H04N 5/253* (2006.01)
*H04N 9/47* (2006.01)
(52) U.S. Cl. ......................................... 348/77
(58) Field of Classification Search ....... 348/77
See application file for complete search history.

(56) References Cited

U.S. PATENT DOCUMENTS

| 5,550,928 | A | 8/1996 | Lu et al. |
| 6,456,437 | B1* | 9/2002 | Lea et al. ............ 359/625 |
| 2001/0031072 | A1* | 10/2001 | Dobashi et al. ........ 382/118 |
| 2003/0142853 | A1 | 7/2003 | Waehner et al. |

FOREIGN PATENT DOCUMENTS

| EP | 1136937 A2 | 9/2001 |
| EP | 1452127 A | 9/2004 |
| FR | 2880158 A1 | 6/2006 |

* cited by examiner

*Primary Examiner* — David Czekaj
*Assistant Examiner* — Anner Holder
(74) *Attorney, Agent, or Firm* — Gerald E. Helget; Nelson R. Capes; Briggs and Morgan, P.A.

(57) ABSTRACT

The invention relates to a system (100) for capturing images of the face of an individual comprising:
  an image capture device (110) having a line of sight (112) directed towards the place from where the individual arrives, and
  two illumination devices (102, 104) disposed symmetrically with respect to the line of sight (112) and at a distance therefrom, each comprising means of generating a light flux intended to illuminate the face of the individual as he moves and whereof the illumination lobe (106, 108), representative of the luminance in a horizontal plane, has a maximum, the two lobes (106, 108) being symmetrical with each other with respect to the line of sight (112),
the capture system (100) being characterized in that the generation means are such that each lobe (106, 108) is asymmetric with respect to the straight line bearing said maximum and has, from this maximum, a first front (122) curved towards the image capture device (110) and a second front (120) that is substantially plane and extending on the side from where the individual comes.

8 Claims, 3 Drawing Sheets

SYSTEM FOR TAKING IMAGES OF THE FACE OF AN INDIVIDUAL

CROSS REFERENCE TO RELATED APPLICATIONS

The present application is based on and claims priority to International Application PCT/EP2007/011097 filed on Dec. 18, 2007 and French Patent Application No. 06/11109 filed on Dec. 19, 2006, the contents of which are hereby incorporated by reference in their entirety.

BACKGROUND OF THE INVENTION

The present invention relates to a system for capturing images of the face of an individual, a face identification system using such an image capture system, and an illumination device for such an image capture system. It finds application in the field of facial recognition of individuals.

A method of facial identification of an individual comprises a step of capturing at least one image of his face, a step of processing the image thus captured, a step of comparing the image thus processed with reference images stored in a database and a step of identification or non-identification of the individual using the result of the comparison step.

A face identification system implementing such a face identification method comprises a system for capturing images of the face of the individual and a processing unit.

The system for capturing images of the face of an individual of the prior art implementing the capture step comprises:

an image capture device, of the camera type, having a line of sight directed towards the place from where the individual arrives, and two illumination devices disposed symmetrically with respect to the line of sight and at a distance therefrom, each comprising means for generating a light flux intended to illuminate the face of the individual as he moves and whereof the illumination lobe, representative of the luminance, has a maximum, the two lobes being symmetrical with respect to the line of sight.

The processing unit implements the other steps of the identification method.

An individual wishing to have himself identified is asked to pass between the two illumination devices in order that the capture device can take at least one image of his face.

Such an identification method is more reliable the more the illumination of the face of the individual is powerful but non-saturated, homogenous and not asymmetric laterally and producing few shadows. Otherwise, the captured image has over-illuminated areas and under-illuminated areas depending on the position of the individual with respect to the line of sight.

FIG. 4 depicts a top view of an illumination device 400 of the prior art which comprises an opaque cage 408 with a window 410 made therein and a light source 402 of the neon type forming the light flux generation means and disposed inside the cage 408. Each illumination device emits, through the window 410, a light flux which is represented by an illumination lobe 406 representative of the luminance in a horizontal plane of the light flux. The straight line referenced 404 passes through the maximum and the illumination lobe 406 is symmetrical with respect to this straight line 404 which makes, with the line of sight 112, an angle α of the order of 50° in order to effectively illuminate the face of the individual and not his side.

An individual who is offset with respect to the line of sight 112 is, through the shape of each illumination lobe 406, strongly illuminated by the illumination device 400 situated on the side where the individual is located and weakly illuminated by the illumination device 400 situated on the other side, thus creating a large illumination disparity on the face of the individual. For a variation of approximately ±30° around the straight line 404, the luminance can be considered as constant. The illumination at a point is inversely proportional to the square of the distance between this point and the illumination device. An individual moving on one side of the line of sight will thus be more strongly illuminated by the illumination device on this side than by the one on the other side.

One solution to this problem consists of greatly constraining the position of the individual during image capture. Such a solution is not optimum on account of this constraint which may inconvenience the individual.

The document U.S. Pat. No. 5,550,928 discloses a recognition device making it possible to recognise individuals placed in front of a television screen and comprising an image capture system.

The capture system comprises:

two IR cameras, each comprising a line of sight and the two lines of sight being convergent with each other, the cameras being directed towards the place where the individuals are located, and two illumination devices disposed symmetrically with respect to a central axis (which here is parallel to the element 44) of the device and at a distance therefrom, each comprising means of generating a light flux intended to illuminate the individuals and whereof the illumination lobe, representative of the luminance in a horizontal plane, has a maximum, the two lobes being symmetrical with each other with respect to the central axis.

As can be seen in FIG. 2 of the document of the prior art and in the corresponding description, the illumination devices are oriented to favour a broad illumination of the space. In particular, through the configuration of each illumination device, each illuminates the space that is located in front of the capture system and the space that is located on the sides thereof.

Through the construction of each illumination device, the straight line bearing the maximum originates from each illumination device and is not oriented towards the central axis of the capture system but in a direction opposite to this central axis.

The use of two cameras makes it possible to observe the space that is illuminated under this broad angle and overall, each camera observes the area illuminated by one of the illumination devices and not the area illuminated by both illumination devices.

The recognition device of the document of the prior art therefore allows a broad illumination of the upstream space, but does not make it possible to focus the illumination towards a specific area of this space, which is desired in the case of an analysis of the face of an individual.

BRIEF SUMMARY OF THE INVENTION

One object of the present invention is to propose a system for capturing images of the face of an individual which does not have the drawbacks of the prior art, and which, in particular, permits a freer positioning of the individual whilst ensuring a homogeneous illumination of his face.

To that end, there is proposed a system for capturing images of the face of an individual comprising:

an image capture device having a line of sight directed towards the place from where the individual arrives, and two illumination devices disposed symmetrically with respect to the line of sight and at a distance therefrom, each comprising means of generating a light flux intended to illuminate the face of the individual as he moves and whereof the illumination lobe, representative of the luminance in a horizontal plane, has a maximum borne by a straight line originating from each illumination device, the two lobes being symmetrical with each other with respect to the line of sight, the capture system being characterised in that the generation means are such that each lobe is asymmetric with respect to the straight line bearing said maximum and has, from this maximum, a first front curved towards the image capture device and a second front that is substantially plane and extending on the side from where the individual comes, and in that, for each illumination device, the straight line bearing the maximum is oriented towards the line of sight.

Advantageously, the image capture system comprises a third illumination device situated in the vicinity of the ground and comprising means of generating a light flux intended to illuminate the face of the individual as he moves and whereof the illumination lobe, representative of the luminance in the vertical plane, has a maximum and the light flux generation means are such that the lobe is asymmetric with respect to the straight line bearing said maximum and has, from this maximum, a first front that is curved and oriented towards the individual and a second front that is substantially plane and extending on the side of the image capture device.

Advantageously, the generation means comprise a first Lambertian source and a micro-prism film, the normal to the first Lambertian source and the normal to the micro-prism film making a non-zero angle with each other.

Advantageously, the generation means comprise a second Lambertian source, the normal to which makes a non-zero angle with the normal to the micro-prism film.

Advantageously, the normal to the first Lambertian source and the normal to the second Lambertian source are substantially orthogonal.

Advantageously, the micro-prism film comprises a plane face oriented towards the Lambertian source or sources and a face carrying prisms.

The invention also proposes a face identification system comprising an image capture system according to one of the preceding variants and a processing unit comprising means for processing the images captured by the image capture system, analysing said images thus processed and identifying each individual using said analysis.

The invention also proposes an illumination device comprising means of generating a light flux whereof the illumination lobe, representative of its luminance in a horizontal plane, has a maximum, and characterised in that the generation means are such that each lobe is asymmetric with respect to the straight line bearing said maximum and has, from this maximum, a first curved front and a second front that is substantially plane.

Advantageously, the generation means comprise a first Lambertian source and a micro-prism film, the normal to the first Lambertian source and the normal to the micro-prism film making a non-zero angle with each other.

Advantageously, the generation means comprise a second Lambertian source, the normal to which makes a non-zero angle with the normal to the micro-prism film.

Advantageously, the normal to the first Lambertian source and the normal to the second Lambertian source are substantially orthogonal.

Advantageously, the micro-prism film comprises a plane face oriented towards the Lambertian source or sources and a face carrying prisms.

BRIEF DESCRIPTION OF THE DRAWINGS

The characteristics of the invention mentioned above, as well as others, will emerge more clearly from a reading of the following description of one example embodiment, said description being given in conjunction with the accompanying drawings, amongst which.

DETAILED DESCRIPTION OF THE INVENTION

Figure 1:
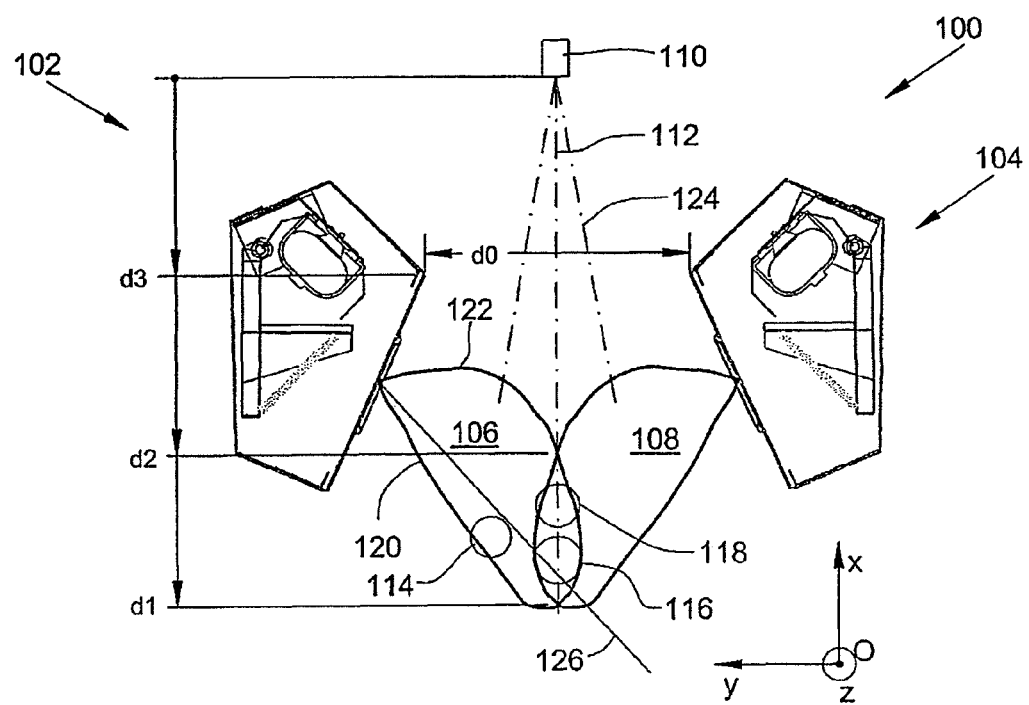
FIG. 1 is a top view of a system for capturing images of the face of an individual according to the invention.

FIG. 1 is a top view of a system 100 for capturing images of an individual which comprises:

an image capture device 110, of the camera type and having a line of sight 112 directed towards the place from where the individual arrives and a capture cone 124 centred on the line of sight 112, and two illumination devices 102 and 104 disposed symmetrically with respect to the line of sight 112 and at a distance therefrom, each comprising means of generating a light flux intended to illuminate the face of an individual as he moves and whereof the illumination lobe 106, 108, representative of the luminance in a horizontal plane, has a maximum, the two lobes 106, 108 being symmetrical with one another with respect to the line of sight 112.

The positions of the head of the individual are represented by the circles referenced 114, 116 and 118.

The reference $(O, \vec{x}, \vec{y}, \vec{z})$ is a direct reference, the plane $(O, \vec{x}, \vec{y})$ is parallel to the ground and is oriented so that the direction of the 'x' axis is parallel to the direction of the line of sight 112, that is to say to the general direction of advance of the individual, and so that the direction of the 'y' axis is orthogonal to the direction of the line of sight 112. The individual moves overall in the direction of increasing 'x's. The elements of FIG. 1 are seen in cross-section through a horizontal plane but they extend along the 'z' axis in a substantially cylindrical shape.

The generation means are such that each lobe 106, 108 is asymmetric in each horizontal plane with respect to the straight line referenced 126 bearing said maximum and has, from this maximum, a first front 122 curved towards the image capture device 110 and a second front 120 that is substantially plane and extending on the side from where the individual comes. On account of this configuration, the luminance around the maximum is no longer constant and varies greatly either side of this maximum. The effect of the distance on the illumination of the face of the individual is then minimised in a larger space either side of the line of sight 112 and over a greater distance along this line. As can be seen in FIG. 1, for each illumination device 102, 104, the straight line 126 bearing the maximum originates from each illumination device 102, 104 and is oriented towards the line of sight 112.

The line of sight 112 and each straight line 126 are convergent substantially to the same point.

The second front 120 is such that a lateral displacement of the individual (position 114) leads to a drop in illumination on account of the greater distance away of the illumination device 104 disposed on the side opposite to the displacement and also a drop in illumination on account of the individual going out of the lobe 106 generated by the illumination device 102 disposed on the side of the displacement. Even though the illumination of the face of the individual decreases, it remains overall homogeneous over the entire face. The image captured by the image capture device 110 is in that case homogeneous and can undergo processing with no risk of distortion of the information it contains (for example: increase in contrast or sensitivity). The second front 120 thus limits the variation in illumination when the individual moves laterally with respect to the line of sight 112.

The first front 122 is such that, during his advance (position 116, then position 118), the individual remains subject to the illumination of the illumination devices 102 and 104 during his movement in the direction of the image capture device 110. The face of the individual is therefore subject to a homogeneous illumination over a greater distance in the direction of the 'x' axis than in the case of an illumination of the prior art. The first front 122 thus limits the variation in illumination when the individual moves towards the image capture device 110. In the region of the maximum, the first front 122 is substantially parallel to the line of sight 112.

The system 100 for capturing images of the face of an individual of the invention allows said individual to be able to position himself more freely within the volume defined between the two illumination devices 102 and 104 whilst ensuring homogeneous illumination of his face in this volume.

Figure 2:
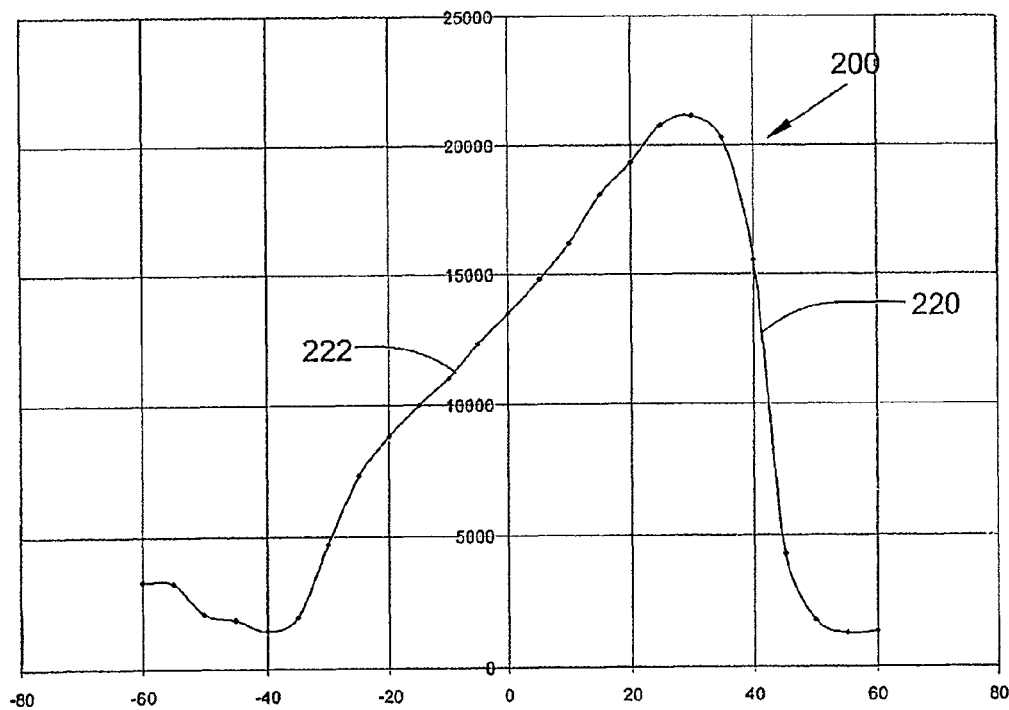
FIG. 2 is a graph characterising the illumination lobe of an illumination device according to the invention.

FIG. 2 is a graph of the luminance (in $cd/m^2$) received by a luminance meter as a function of its angular position (in degrees) with respect to the illumination device 102 for a particular embodiment of the invention. The luminance meter is disposed on the line of sight in a position referred to as the nominal measurement position which corresponds substantially to that of the circle referenced 116. In this nominal position, the angle between the illumination device 102 and the luminance meter is considered to be zero. Rotation of the illumination device 102 around an axis parallel to the 'z' axis makes it possible to determine the curve 200. The curve 200 has a first slope 222 corresponding to the first front 122 which has a slope of approximately 290 $cd/m^2$ per degree of rotation. The curve 200 also has a second slope 220 corresponding to the second front 120 which has a slope of approximately $-1600$ $cd/m^2$ per degree of rotation, that is to say, disregarding the sign, very much greater than that of the first slope 222. The axis of rotation parallel to the 'z' axis is here positioned at the centre of the light source which is described hereinafter. The numerical values are given by way of example and can be different according to the technical characteristics of the image capture system 100.

Figure 3:
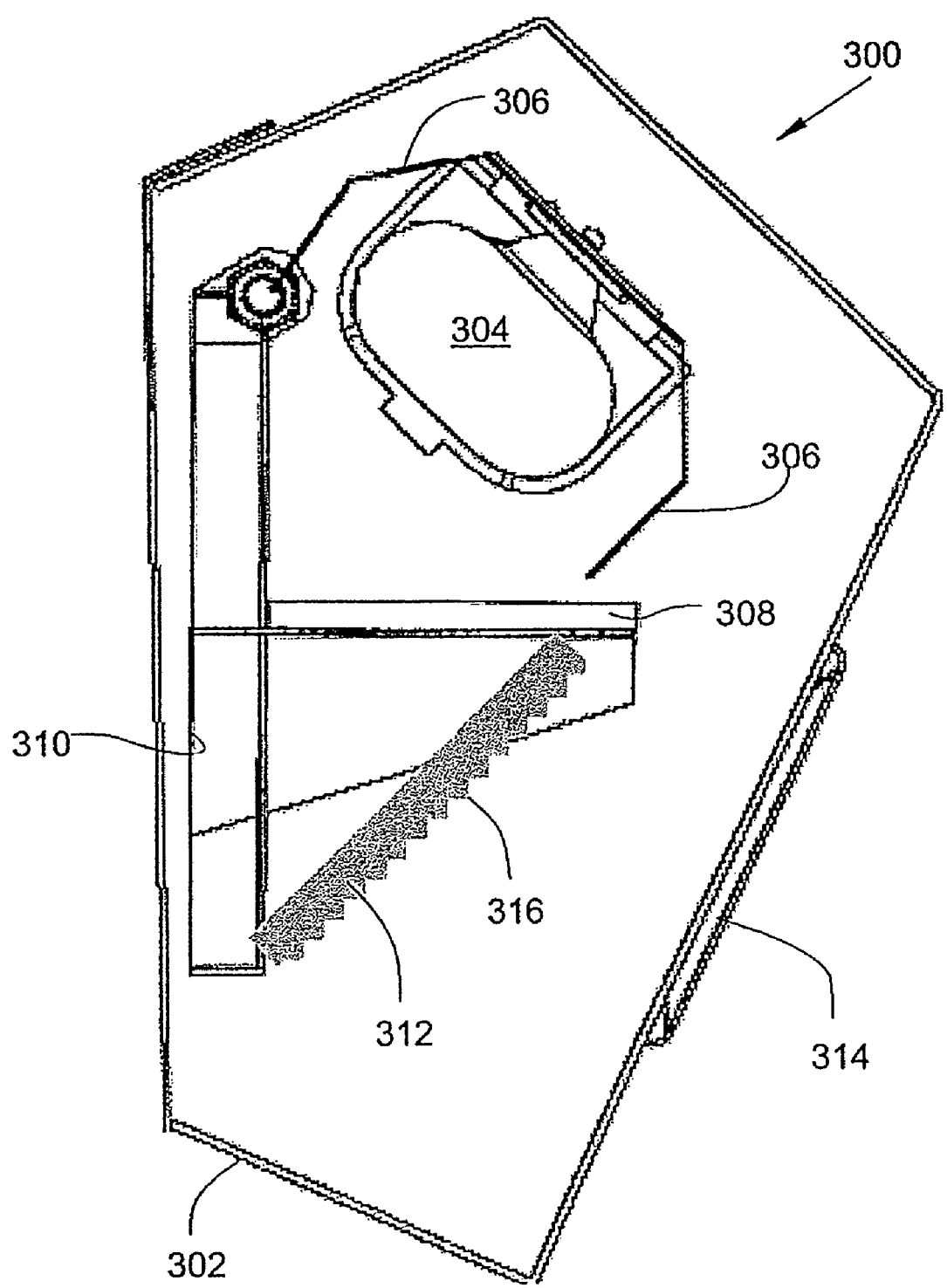
FIG. 3 depicts a top view of an illumination device according to the invention.
Figure 4:
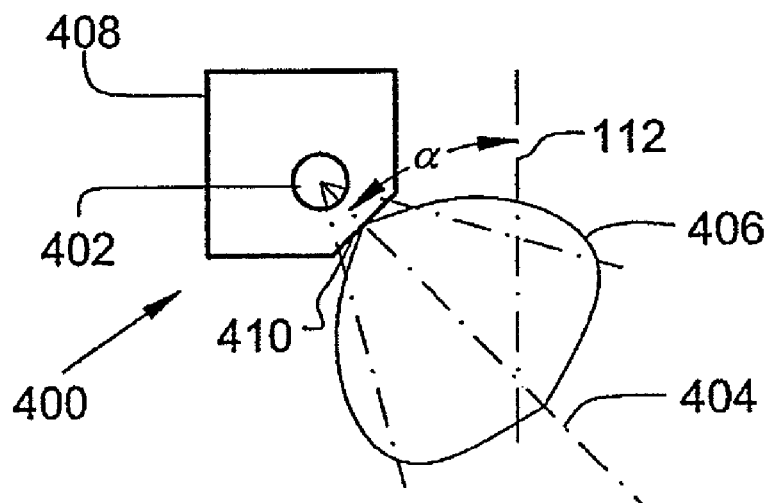
FIG. 4 depicts a top view of an illumination device of the prior art.

FIG. 3 shows an illumination device 300 according to the invention which comprises an opaque cage 302 with a window 314 made therein and generation means consisting of a frosted glass 308 and a light source 304 of the neon type disposed inside the cage 302 and emitting a light flux through the window 314 after passing through the frosted glass 308. In order to shape the illumination lobe emitted by the illumination device 300 according to the shape described above and having the reference 106 in FIG. 1, the generation means also comprise a micro-prism film 312 disposed between the frosted glass 308 and the window 314 which behaves as a first Lambertian source.

The micro-prism film 312 comprises a plane face oriented towards the frosted glass 308 and a face bearing prisms 316 oriented towards the window 314. The film having the reference "Vikuiti Brightness Enhancement Film (BEF) II" and manufactured by the 3M company is an example of a micro-prism film 312 that can be used.

The axis of the prisms 316 which is normal to the plane surface of the micro-prism film 312 makes, with the direction normal to the frosted glass 308, that is to say with the direction normal to the first Lambertian source, an angle different from zero, and preferably of the order of 45°. Through the presence of this angle, the micro-prism film 312 redirects the light beams which are diffused through the frosted glass 308 in the form of an asymmetric luminance spectrum conforming to the one referenced 106 in FIG. 1.

In order to channel the maximum amount of light intensity emitted by the light source 304, the sides thereof, which are not oriented towards the frosted glass 308, can be surrounded by reflective surfaces 306.

The direction of the straight line 126 bearing the maximum is substantially coincident with the normal to the plane surface of the micro-prism film 312.

In order to further increase the asymmetry of the illumination lobe, the generation means comprise a reflective screen 310, disposed downstream of the frosted glass 308 and upstream of the micro-prism film 312 and which constitutes a second Lambertian source which reflects the light beams coming from the first Lambertian source. The normal to the second Lambertian source 310 makes a non-zero angle with the normal to the micro-prism film 312.

In particular, the normal to the first Lambertian source 304, 308 and the normal to the second Lambertian source 310 are substantially orthogonal. The light beams, which are reflected by this reflective screen 310, increase the curved shape of the first front 122.

As a result of the tolerance in the positioning of the individual being greater than in the case of the prior art, it is possible to increase the spacing between the two illumination devices 102 and 104, that is to say the passage width, and thus obtain a wider image capture system 100.

The placing and orientation of each illumination device 102, 104 are carried out according to the desired passage width.

According to a particular embodiment of the invention, the passage width referenced d0 is equal to 800 mm. The distance of the passage to the capture device d3 is equal to 1.05 m. The distance referenced d1 corresponding to the start of illumination of the face is equal to 1.90 m. The distance referenced d2 corresponding to the end of illumination of the face is equal to 1.40 m. Under these conditions, the straight line with angle 0° on the graph of FIG. 2 corresponds to the straight line originating from the window 314 of the illumination device 102 and cutting the line of sight 112 at an angle of approximately 55°. With the power of the light source 304 being adapted so as to produce a non-saturated illumination, the straight line 126 thus forms an angle of approximately 27° (see FIG. 2) with the straight line at 55°.

The position of the head referenced 116 corresponds to a nominal position for capture of the face which is offset preferably by the order of 5° to 10° (here 10°) upstream with respect to the straight line 126. In this embodiment, the straight line originating from the window 314 and passing through the nominal position forms an angle of 17° with the straight line at 55°, and the straight line originating from the window 314 and passing through a position 550 mm upstream on the line of sight 112 with respect to the nominal position forms an angle of 11° with the straight line at 55°.

In the same way, for a lateral offset of 300 mm with respect to the line of sight 112 at the abscissa d1, the straight line originating from the window 314 and passing through this position forms an angle of 40° with the straight line at 55°. For a lateral offset of 300 mm with respect to the line of sight 112 at the abscissa d2, the straight line originating from the window 314 and passing through this position forms an angle of 37° with the straight line at 55°.

These various values, which are given by way of example, show the volume in which the individual can move whilst retaining an optimum illumination of his face.

The placing of the capture system 100 is dependent on the desired passage width d0. When this passage width d0 is fixed, the image capture device 110 is placed and each illumination device 102, 104 is positioned and oriented so as to optimise the volume in which the individual can position himself whilst retaining an optimum illumination of his face.

A face identification system comprises a system 100 for capturing images of the face of the individual according to the invention and a processing unit comprising means for processing the images captured by the image capture system 100, analysing said images thus processed and identifying each individual passing between the two illumination devices 102 and 104 using said analysis.

Figure 5:
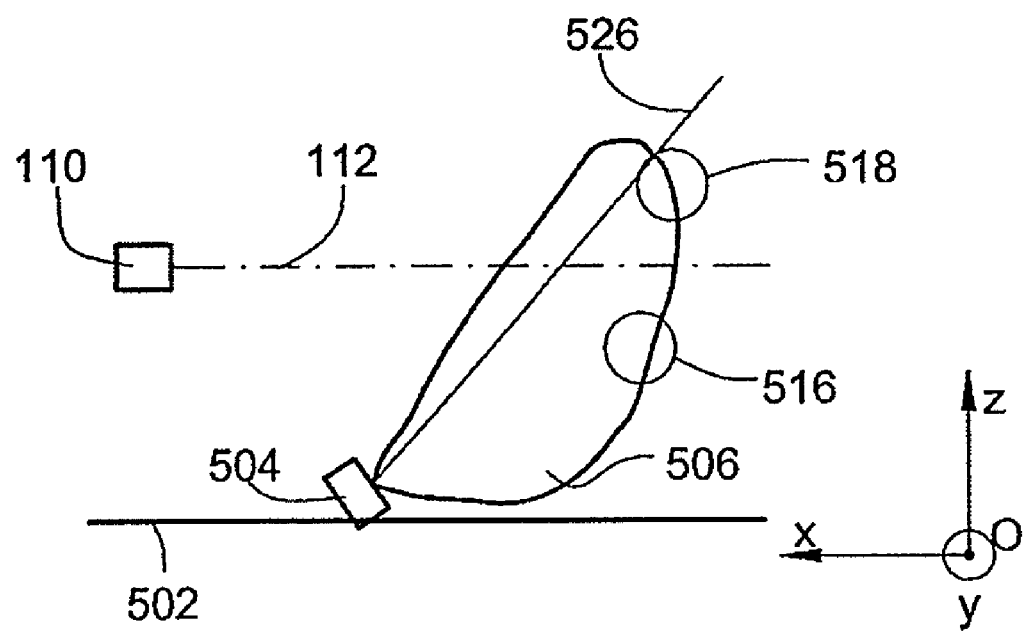
FIG. 5 depicts a sectional view through a vertical plane of an illumination device according to the invention.

FIG. 5 is a sectional view through a vertical plane passing through the line of sight 112 of another embodiment of the invention.

The image capture system 100 furthermore comprises a third illumination device 504 situated preferably at a vertical with the line of sight 112 and in the vicinity of the ground 502 on which the individual is moving. The third illumination device 504 comprises means of generating a light flux intended to illuminate the face of the individual as he moves and whereof the illumination lobe 506, representative of the luminance in the vertical plane, has a maximum. The straight line referenced 526 originates from the illumination device 504 and bears said maximum. The light flux generation means are such that the lobe 506 is asymmetric with respect to the straight line 526 and has, from this maximum, a first front 522 that is curved and oriented towards the individual and a second front 520 that is substantially plane and extending on the side of the image capture device 110.

The circles referenced 516 and 518 represent respectively the position of the head of a small-sized individual and the position of the head of a large-sized individual.

The third illumination device 504 makes it possible to keep a substantially identical illumination for all individuals whatever their size, that is to say their distance with respect to the third illumination device 504.

The first front 522 is substantially vertical. The luminance for each individual is then substantially equivalent whatever their size, that is to say whatever the angle between the straight line 526 and the position of the head of the individual.

Since the illumination at a point is inversely proportional to the square of the distance from this point to the illumination device and proportional to the luminance at this point, itself dependent on the angle between the straight line 526 and the position of this point, the lobe 506 as defined makes it possible to modulate the luminance in order to obtain a substantially constant illumination for all individuals.

The third illumination device 504 is similar to the preceding illumination devices 102 and 104 and comprises a light source emitting a light flux and a micro-prism film passed through by said light flux.

Of course, the present invention is not limited to the examples and embodiments described and depicted, but is capable of numerous variants accessible to persons skilled in the art.

The invention claimed is:

1. Illumination device (102, 104, 130) comprising a means for generating an illumination lobe (106, 108) comprising a maximum and representative of its luminance in a horizontal plane, each generating means comprising means for forming a lobe (106, 108) that is asymmetric with respect to a straight line bearing the maximum and having, from this maximum, a first front (122) that is curved and a second front (120) that is substantially plane, the illumination device (102, 104, 130) comprising:
an opaque cage (302) with a window (314) made therein; and
said generating means further comprising:
a) a frosted glass (308) disposed inside the cage (302);
b) a light source (304) disposed inside the cage (302) and emitting a light flux through the window (314) after passing through the frosted glass (308); and
c) a micro-prism film (312) disposed between the frosted glass (308) and the window (314) and comprising a plane face oriented towards the frosted glass (308) and a face bearing prisms (316) oriented towards the window (314).

2. Illumination device (102, 104, 130) according to claim 1, wherein the axis of the prism (316) is normal to the plane face of the micro-prism film (312) and makes, with the direction normal to the frosted glass (308), an angle different from zero.

3. Illumination device (102, 104, 130) according to claim 2, wherein said angle is of the order of 45.

4. Illumination device (102, 104, 130) according to claim 1, wherein sides of the light source (304) which are not oriented towards the frosted glass (308), are surrounded by reflective surfaces (306).

5. Illumination device (102, 104, 130) according to claim 4, wherein said generating means further comprises a reflective screen (310), disposed downstream of the frosted glass (308) and upstream of the micro-prism film (312) and the normal thereof makes a non-zero angle with the normal to the micro-prism film (312).

6. System (100) for capturing images of a face of an individual comprising:
a) an image capture device (110) having a line of sight (112) directed towards the place from where the individual arrives; and
b) two illumination devices (102, 104, 300) according to claim 1 disposed symmetrically with respect to the line of sight (112) and at a distance therefrom, the lobes (106, 108) generated by each of the illumination devices (102, 104, 300) being symmetrical with one another with respect to the line of sight (112) and, for each illumination device (102, 104, 300), the straight line (126) bearing the maximum is oriented towards the line of sight (112) toward the front of the image capture device (110).

7. System (100) for capturing images according to claim 6, further comprising a third illumination device (504) situated in the vicinity of the ground (502) and comprising means for generating a light flux intended to illuminate the face of the individual as he moves and said third illumination device (504) further comprises an illumination lobe (506) whereof the illumination lobe (506), representative of the luminance in the vertical plane, has a maximum; and
wherein the means for generating a light flux are such that the lobe (506) is asymmetric with respect to a straight line (526) bearing said maximum and has, from this maximum, a first front (522) that is curved and oriented towards the individual and a second front (520) that is substantially plane and extending on the side of the image capture device (110).

8. Face identification system comprising an image capture system (100) according to claim 6 and comprising a processing unit comprising means for processing the images captured by the image capture system (100), analysing said images thus processed, and identifying each individual using said analysis.

* * * * *